Jan. 7, 1958    G. E. FALCIGLIA    2,818,778
TWO WAY VIEWING DEVICE FOR VEHICLES
Filed April 8, 1954    2 Sheets-Sheet 1
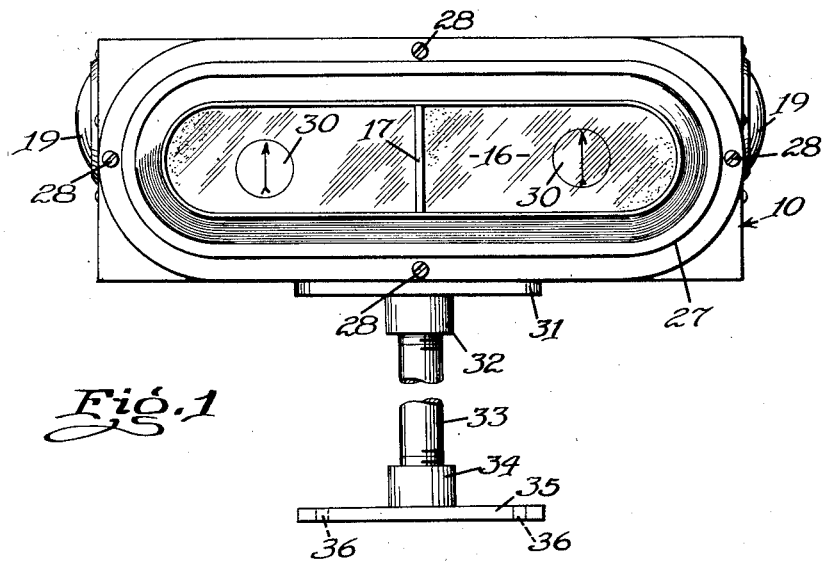
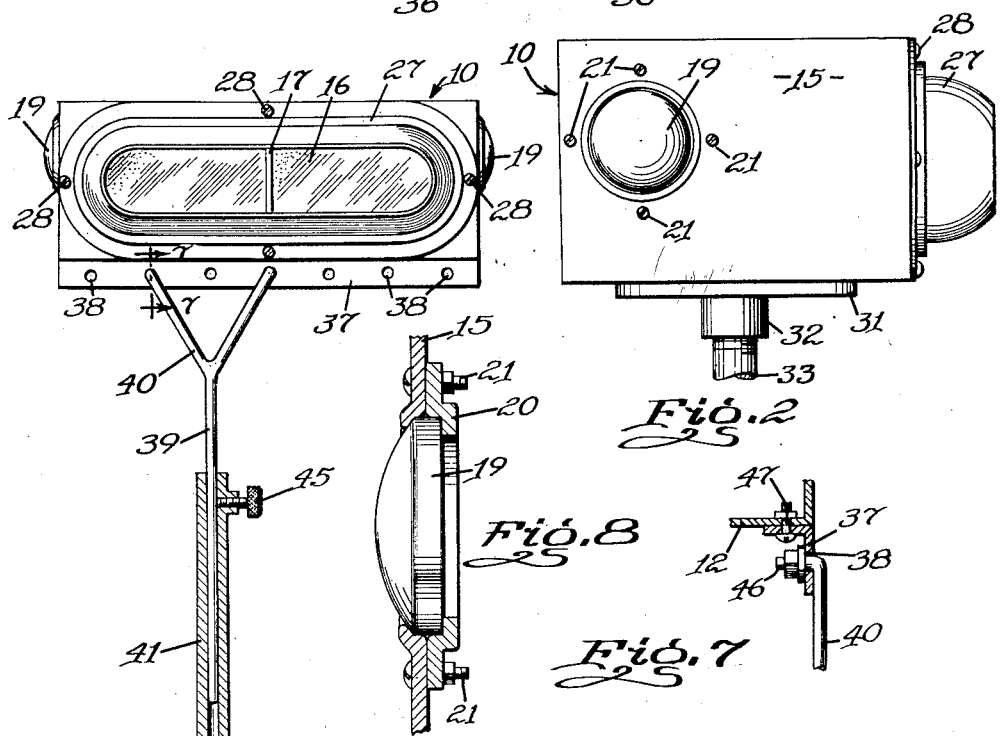
INVENTOR.
Guy Edward Falciglia
BY 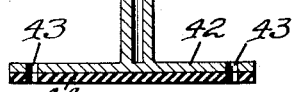
ATTORNEYS Jan. 7, 1958   G. E. FALCIGLIA   2,818,778
TWO WAY VIEWING DEVICE FOR VEHICLES
Filed April 8, 1954   2 Sheets-Sheet 2

INVENTOR.
Guy Edward Falciglia
BY Victor J. Evans & Co.
ATTORNEYS

United States Patent Office 2,818,778
Patented Jan. 7, 1958

2,818,778

TWO WAY VIEWING DEVICE FOR VEHICLES

Guy Edward Falciglia, Greenwood, R. I.

Application April 8, 1954, Serial No. 421,742

1 Claim. (Cl. 88—87)

This invention relates to a viewing device, and more particularly to a safety viewing device for use by motorists and the like.

The object of the invention is to provide a safety viewing device which will permit motorists to drive with greater safety, especially at street or road intersections, since a person will be able to simultaneously see what is happening on both sides of the vehicle as well as in front of the vehicle.

Another object of the invention is to provide a viewing device which will permit a person to simultaneously see at a glance what is happening in two opposite areas without the necessity of the person removing his attention from the area in front of him whereby the element of chance will be removed during driving especially at an intersection.

A further object of the invention is to provide an intersection viewer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a front elevational view of the viewing device, constructed according to the present invention.

Figure 2 is a side elevational view of the housing of the viewing device.

Figure 6 is a front elevational view of the viewing device showing a modified stand or support.

Figure 7 is a sectional view taken on the line 7—7 of Figure 6.

Figure 8 is a sectional view taken on the line 8—8 of Figure 4.

Figure 3:
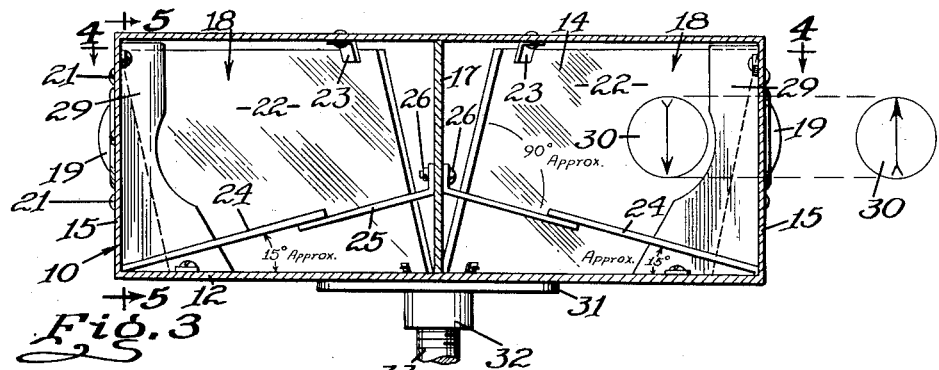
Figure 3 is a sectional view taken on the line 3—3 of Figure 4.
Figure 4:
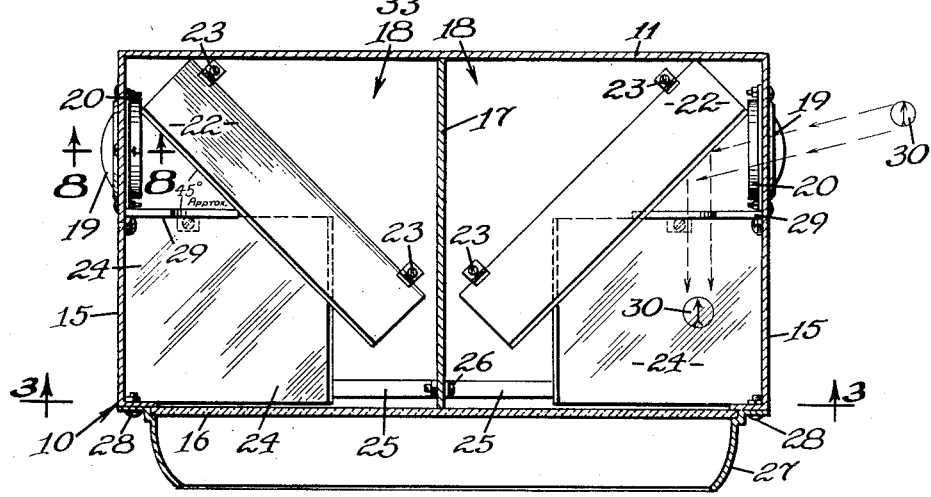
Figure 4 is a sectional view taken on the line 4—4 of Figure 3.
Figure 5:
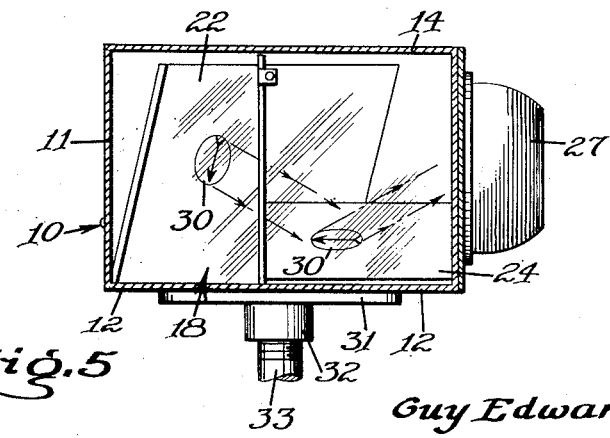
Figure 5 is a sectional view taken on the line 5—5 of Figure 3.

Referring in detail to the drawings, the numeral 10 designates a hollow housing or casing which can be made of any suitable material, and the housing 10 includes a back wall 11, a horizontally disposed bottom wall 12, and a top wall 14, Figure 5. The housing 10 further includes end walls 15, and there is provided a viewing screen 16 which can be made of any suitable material such as frosted glass.

Extending transversely through the housing 10 and secured therein is a partition 17 which defines or provides a pair of similar compartments 18 within the housing.

Each of the end walls 15 of the housing is provided with an opening and positioned in this opening is a lens 19, Figure 8. The lens 19 is retained in its proper place in the wall 15 by means of a bracket 20 which is secured to the wall 15 in any suitable manner, as for example by means of bolt and nut assemblies 21.

Positioned in each of the compartments 18 is a pair of mirrors 22 and 24. The mirror 22 is arranged approximately at a 90 degree angle with respect to the miror 24, and the mirror 24 is arranged approximately at a 15 degree angle with respect to the bottom wall 12 of the housing. The mirror 22 may be retained in its proper position in any suitable manner, as for example by means of clips 23, while the mirror 24 can be supported on a bracket 25 which can be secured to the partition 17 by means of bolt and nut assemblies 26. Thus, it will be seen that images will pass through the pair of lenses 19, and be received in an inverted arrangement on the mirrors 22. These inverted images will then be reflected from the mirrors 22 onto the mirrors 24 and the mirrors 24 will reinvert the image so that it appears right side up on the viewing screen 16.

Surrounding the viewing screen 16 and projecting from the housing is a shade 27. The shade 27 can be secured to the housing in any suitable manner, as for example by means of screws or bolt and nut assemblies 28. A shade 29 is positioned within each of the compartments 18 for a purpose to be later described. The shade 29 is interposed between the pair of mirrors 22 and 24. The numeral 30 designates the image that is to be viewed on the screen 16.

A means is provided for supporting the housing so that it can be mounted in any suitable location, as for example on a suitable part of a vehicle such as an automobile. This supporting means comprises a plate 31 which is secured to the bottom wall 12 of the housing 10, and depending from the plate 31 is a bushing 32. A post 33 is arranged in threaded engagement with the bushing 32, and the lower end of the post 33 engages a sleeve 34 which is secured to a bracket or plate 35. The plate 35 is provided with a plurality of apertures 36 whereby suitable securing elements such as bolts or screws can be extended through the apertures 36 and into engagement with the vehicle for maintaining the viewing device immobile in its proper position.

Referring to Figures 6 and 7 of the drawings, there is shown a modified supporting means for the housing. Thus, the numeral 40 indicates each of a pair of angularly arranged arms which are provided with upper transverse ends 46. The transverse ends 46 project through certain of the apertures 38 which are arranged in an L-shaped flange 37. The flange 37 is secured to the housing 10 in any suitable manner, as for example by means of bolt and nut assemblies 47. The angularly arranged arms 40 project from the upper end of a rod 39 which is adjustably mounted in a hollow sleeve 41. The lower end of the sleeve 41 is secured to a plate 42 which is provided with apertures 43 through which project suitable securing elements for connecting the plate 42 to a support such as an automobile. A resilient pad 44 is mounted below the plate 42 for cushioning the device. A set screw 45 is provided for maintaining the rod 39 immobile in its various adjusted positions. The arrangement shown in Figure 6 permits the housing 10 to be adjusted transversely or laterally with respect to the rod 39.

From the foregoing it is apparent that there has been provided a safety viewing device which is especially useful by motorists when approaching intersections. In use the device can be mounted on a suitable car or vehicle and the user looks at the viewing screen 16. Images will be transferred through the lenses 19 onto the mirrors 22 and these images will be inverted due to the lenses 19. The images will then be reflected from the mirrors 22 onto the mirror 24 where they will be reinverted so that they are now right side up and these images will appear on the viewing screen 16. Thus, the user will be able to see straight ahead with his own eyes in the usual manner, and the user will also be able to readily see the area at right angles to his normal line of vision. The shades 29 provide a means for inhibiting or preventing glare. The two viewer of the present invention points out what is at right angles to a driver and not what is in front of the driver. The two viewer has four mirrors, two lenses and the shade 27. The screen 16 may be a frosted or ground glass viewer and the partition 17 acts as a separator between the mirror assemblies. The arrangement of mirrors insures that there will be a normal erect image which is the desired effect, and the lenses 19 are of the wide angle type so that a car can approach an intersection at any angle and a driver will still see what is approaching from either side. Thus, a person will be able to see cars approaching and leaving the intersection, sidewalks, and in fact anything encompassed by the angles of the lenses. Also the two viewer shows up cars approaching at a great distance both in the daytime and at night. Thus the two viewer supplements the driver's vision by giving him or her the benefit of broadened vision. Also you do not have to move your head at all in order to see two pictures at once of what is happening in two opposite directions due to the provision of the lenses 19. The images on the frosted glass 16 are readily visible from a variety of angles and even if the driver happens to move his head slightly the image will not be lost. Also the two viewer is a closed unit so that its efficiency will not be diminished due to adverse weather conditions such as snow, rain and the like. Also the stand for supporting the two viewer may be rigid or adjustable and as shown in Figures 6 and 7 the housing can be adjusted both horizontally and vertically. The device can be placed on many different parts of a vehicle such as an automobile. Thus it may be placed on the driver's side fender or it may be attached to the automobile between the headlight and the hood or to the hood itself or to the hood ornament. Furthermore, it may be attached to the roof of the car just above the windshield on the driver's side. It may be necessary to change the angles of the mirrors inside the housing depending upon the location of the device in order to insure maximum efficiency from the various locations. Also the shape and design of the housing can be varied and the resilient pad 44 can be used as a shock absorber to help insure stability of the mirrors inside the device and also to help prevent jarring of the instrument and possible loss of the proper angles of the mirrors. The mirrors themselves may be backed with strips of rubber or other soft material which may also act as shock absorbers and the mirrors can be secured in place in any suitable manner. The 15 degree angles between the mirrors 24 and the bottom wall 12 may be varied slightly and also the 90 degree angular relationship between the mirrors 22 and 24 may be varied. The shades 29 cut off the glare which comes from the lens 19 and which tend to interfere with the picture on the frosted glass 16. The two viewer enlarges a person's vision periphery and it complements the limited peripheral vision with which man was endowed by nature. Also the present invention can be used on aircraft both on the ground and in the air and may be used on boats. With the present invention a motorist can see simultaneously what is approaching both from the left and right as well as what is happening in front of him. The shade 27 serves to compensate for any excessive amount of light that may shine on the frosted or ground glass viewer 16, and the housing 10 can be made of any suitable material such as metal, wood, plastic or the like. The shade 27 is black on the inside. The images 30 which appear on the screen 16 are in the same normal erect position as the objects in the intersection due to the provision of the pair of mirrors in each compartment. The partition 17 serves as a line of demarcation between pictures.

I claim:

In a two-way viewing device for a vehicle, an elongated housing, a partition positioned in said housing intermediate its ends and defining a pair of compartments therein, a lens positioned in each end of said housing, a translucent viewing screen mounted in said housing and covering substantially the front thereof, said screen adapted to be viewed by an occupant of the vehicle, a shade surrounding said viewing screen, first and second angularly arranged mirrors positioned in each of said compartments for directing images from the lenses to said viewing screen, the first mirrors being arranged at an angle of approximately 45° with respect to the lenses, the second mirrors being arranged at an angle of approximately 15° with respect to the bottom of the housing, said first mirrors being arranged in a generally vertical plane, the second mirrors being arranged in a generally horizontal plane, said first and second mirrors being arranged at an angle of approximately 90° with respect to each other, said second mirrors being arranged closer to the viewing screen than the first mirrors, said first mirrors picking up the image in an inverted position, said second mirrors serving to reinvert the image and transmit it to the screen in its true normal upright position whereby persons can view images right side up.

References Cited in the file of this patent

UNITED STATES PATENTS

| 951,755 | Crane | Mar. 8, 1910 |
| 1,676,901 | Hueller | July 10, 1928 |
| 1,748,624 | Shively | Feb. 25, 1930 |
| 2,680,398 | Kohut | June 8, 1954 |

FOREIGN PATENTS

| 256,776 | Great Britain | Aug. 19, 1926 |
| 312,816 | Great Britain | June 6, 1929 |
| 422,639 | Great Britain | Jan. 16, 1935 |